United States Patent
Mabuchi et al.

(10) Patent No.: US 11,402,197 B2
(45) Date of Patent: Aug. 2, 2022

(54) DISTANCE MEASURING MODULE

(71) Applicants: SONY CORPORATION, Tokyo (JP); SONY SEMICONDUCTOR SOLUTIONS CORPORATION, Kanagawa (JP)

(72) Inventors: Kouji Mabuchi, Aichi (JP); Takeo Arai, Aichi (JP); Nobuhiro Kihara, Aichi (JP); Kazunori Yamamoto, Kanagawa (JP); Go Asayama, Kanagawa (JP)

(73) Assignees: Sony Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 189 days.

(21) Appl. No.: 16/645,040

(22) PCT Filed: Jun. 25, 2018

(86) PCT No.: PCT/JP2018/023968
§ 371 (c)(1),
(2) Date: Mar. 6, 2020

(87) PCT Pub. No.: WO2019/053998
PCT Pub. Date: Mar. 21, 2019

(65) Prior Publication Data
US 2020/0309514 A1    Oct. 1, 2020

(30) Foreign Application Priority Data

Sep. 13, 2017    (JP) .............................. JP2017-175566

(51) Int. Cl.
*G01B 11/25* (2006.01)
*G01B 11/02* (2006.01)
*G01C 3/06* (2006.01)

(52) U.S. Cl.
CPC ............ *G01B 11/25* (2013.01); *G01B 11/022* (2013.01); *G01C 3/06* (2013.01)

(58) Field of Classification Search
CPC ........ G01C 3/06; G01B 11/022; G01B 11/00; G01B 11/25
See application file for complete search history.

(56) References Cited

U.S. PATENT DOCUMENTS

| 6,060,722 A * | 5/2000 | Havens .............. G06K 7/10732 |
| | | 235/462.2 |
| 2002/0181353 A1 * | 12/2002 | Katayama ............ G11B 7/1378 |
| | | 369/44.37 |

(Continued)

FOREIGN PATENT DOCUMENTS

| JP | H03-053103 | 3/1991 |
| JP | H07-043115 | 2/1995 |

(Continued)

OTHER PUBLICATIONS

International Search Report prepared by the Japan Patent Office dated Sep. 7, 2018, for International Application No. PCT/JP2018/023968.

*Primary Examiner* — Sang H Nguyen
(74) *Attorney, Agent, or Firm* — Sheridan Ross P C.

(57) ABSTRACT

A structure for measuring a distance on the basis of the principle of triangulation is simplified. A distance measuring module includes a diffractive optical element, an imaging element, and a distance measuring unit. The diffractive optical element emits a predetermined number of line light beams. The imaging element images the line light beams with which the subject is irradiated. The measuring unit measures a distance from the subject by using triangulation on the basis of the imaged line light beams. Thus, by (Continued)

imaging the line light beams emitted via the diffractive optical element, the distance from the subject is measured with a simple structure.

21 Claims, 19 Drawing Sheets

(56) References Cited

U.S. PATENT DOCUMENTS

| | | | | |
|---|---|---|---|---|
| 2006/0114459 | A1* | 6/2006 | Aikawa | G01J 3/2803 |
| | | | | 356/328 |
| 2010/0008588 | A1* | 1/2010 | Feldkhun | G01B 11/2527 |
| | | | | 382/206 |
| 2010/0296104 | A1 | 11/2010 | Abramovich et al. | |
| 2011/0037964 | A1 | 2/2011 | Imamura | |
| 2012/0154807 | A1* | 6/2012 | Usami | G01B 11/026 |
| | | | | 356/369 |
| 2012/0194641 | A1 | 8/2012 | Kimura | |
| 2013/0050710 | A1* | 2/2013 | Yamaguchi | G01C 3/08 |
| | | | | 356/610 |
| 2013/0121126 | A1* | 5/2013 | Yamagishi | G11B 7/1353 |
| | | | | 369/112.01 |
| 2013/0200155 | A1* | 8/2013 | Weber | G06K 7/10881 |
| | | | | 235/454 |
| 2014/0169635 | A1* | 6/2014 | Nishimura | G06T 7/507 |
| | | | | 382/106 |
| 2015/0042996 | A1* | 2/2015 | Funamoto | G01J 3/0264 |
| | | | | 356/402 |
| 2016/0223828 | A1* | 8/2016 | Abraham | G02B 27/09 |
| 2016/0341399 | A1 | 11/2016 | Raz et al. | |
| 2017/0122728 | A1* | 5/2017 | Kipfer | G02B 27/0927 |
| 2017/0186182 | A1 | 6/2017 | Raz et al. | |
| 2018/0010903 | A1* | 1/2018 | Takao | G01S 17/89 |

FOREIGN PATENT DOCUMENTS

| | | |
|---|---|---|
| JP | H07-318309 | 12/1995 |
| JP | 2006-010510 | 1/2006 |
| JP | 2010-271312 | 12/2010 |
| JP | 2011-089961 | 5/2011 |
| JP | 2012-159412 | 8/2012 |
| JP | 2013-011511 | 1/2013 |
| JP | 2014-048128 | 3/2014 |
| JP | 2014-167387 | 9/2014 |
| WO | WO 2016/157593 | 10/2016 |

* cited by examiner a b c d e f

DISTANCE MEASURING MODULE

CROSS REFERENCE TO RELATED APPLICATIONS

This application is a national stage application under 35 U.S.C. 371 and claims the benefit of PCT Application No. PCT/JP2018/023968 having an international filing date of 25 Jun. 2018, which designated the United States, which PCT application claimed the benefit of Japanese Patent Application No. 2017-175566 filed 13 Sep. 2017, the entire disclosures of each of which are incorporated herein by reference.

TECHNICAL FIELD

The present technology relates to a distance measuring module. Specifically, the present technology relates to a distance measuring module that irradiates a subject with line light beams and measures a distance from the subject by using triangulation on the basis of the emitted line light beams.

BACKGROUND ART

There are conventionally known methods for measuring a depth and a distance from a subject in a three-dimensional space in a non-contact manner. For example, there are a method of irradiating a subject with infrared rays, ultrasonic waves, laser beams, or the like and measuring a return time of a reflected wave, a method of calculating a distance on the basis of a state of reflected light from a subject, and the like. As an example, there has been proposed a distance measuring device that measures a distance on the basis of the principle of triangulation by rotating a scanning mirror including a galvanometer mirror or the like to scan slit light over an object to be measured (see, for example, Patent Document 1).

CITATION LIST

Patent Document

Patent Document 1: Japanese Patent Application Laid-Open No. 7-043115

SUMMARY OF THE INVENTION

Problems to be Solved by the Invention

In the above-described related art, a distance is measured by scanning slit light. However, this related art requires a mechanism for greatly vibrating slit light with respect to an object to be measured during scanning, and complicated actuator control is required. In addition, power consumption is increased for the actuator control, and devices to be mounted are limited. Thus, there is a problem that the related art is not suitable for size reduction.

The present technology has been created in view of such a situation, and an object thereof is to simplify a structure for measuring a distance on the basis of the principle of triangulation.

Solutions to Problems

The present technology has been made to solve the above-described problems. A first aspect of the present technology is a distance measuring module including: a diffractive optical element that emits a predetermined number of line light beams; an imaging element that images the line light beams with which a subject is irradiated; and a distance measuring unit that measures a distance from the subject by using triangulation on the basis of the imaged line light beams. Therefore, the distance from the subject can be measured by imaging the line light beams with which the subject is irradiated by the diffractive optical element.

Further, in the first aspect, a light source that supplies substantially parallel light to the diffractive optical element may be further provided. The light source may include a laser generation unit that generates a laser beam, and a collimator optical system that converts the laser beam from the laser generation unit into the substantially parallel light. Therefore, the generated laser beam can be converted into the substantially parallel light and be supplied to the diffractive optical element.

Further, in the first aspect, the light source may further include a vibration unit that vibrates the substantially parallel light, and the imaging element may image the line light beams in conjunction with the vibration. Therefore, a scanning range for distance measurement can be increased.

Further, in the first aspect, the vibration unit may vibrate the substantially parallel light in a direction orthogonal to a direction of the line light beams. Therefore, the line light beams can be efficiently interpolated.

Further, in the first aspect, the vibration unit may vibrate the substantially parallel light so that its amplitude is larger than a width of an interval between the line light beams. Therefore, the line light beams can be comprehensively interpolated by considering the scanning range as a plane.

Further, in the first aspect, a position detection unit that detects a position of an object to be vibrated by the vibration unit may be further provided, and the imaging element may perform imaging in conjunction with the vibration, in accordance with the detected position. Therefore, imaging can be performed in conjunction with the vibration in accordance with the position of the object to be vibrated.

Further, in the first aspect, the vibration unit may vibrate the substantially parallel light by vibrating the collimator optical system.

Further, in the first aspect, the vibration unit may vibrate the substantially parallel light by vibrating the laser beam from the laser generation unit.

Further, in the first aspect, the collimator optical system may be a collimator lens, and the light source may further include a reflecting mirror that reflects the laser beam from the laser generation unit and guides the laser beam to the collimator lens. Therefore, an optical path of the laser beam can be bent.

Further, in the first aspect, the vibration unit may vibrate the substantially parallel light by changing an angle of the reflecting mirror.

Further, in the first aspect, the vibration unit may include an actuator including a magnetic circuit or a piezoelectric element.

Further, in the first aspect, the collimator optical system may be a collimator lens, and the light source may further include a reflecting mirror that reflects the substantially parallel light from the collimator lens and guides the substantially parallel light to the diffractive optical element.

Further, in the first aspect, the collimator optical system may be a collimator lens, and the diffractive optical element may be formed on a surface of a reflecting mirror that reflects the substantially parallel light from the collimator lens. Further, the diffractive optical element may be formed on a surface of the collimator optical system.

Further, in the first aspect, the collimator optical system may be a Fresnel lens. Further, the collimator optical system may be an aspherical mirror.

Further, in the first aspect, the diffractive optical element may be installed so that an optical axis is inclined with respect to an imaging surface of the imaging element. Therefore, the 0th order light can be shifted from a center position of a distance measurement range. In this case, the imaging element may set, as an imaging range, an area other than an irradiation area of the 0th order light from the diffractive optical element, on the basis of the inclination of the optical axis.

Further, in the first aspect, the diffractive optical element may correct deformation or distortion of an irradiation pattern shape caused by the inclination of the optical axis, or may correct both the deformation and distortion. Therefore, malfunction caused by the inclination of the optical axis can be solved.

Further, in the first aspect, the imaging element may be a two-dimensional area sensor.

Further, in the first aspect, each of the line light beams may have a curve. Further, the line light beams may be infrared light. In this case, the imaging element can detect the infrared light reflected by the subject.

Effects of the Invention

The present technology can have an excellent effect of simplifying a structure for measuring a distance on the basis of the principle of triangulation and reducing a size of a device. Note that the effects described herein are not necessarily limited, and any of the effects described in the present disclosure may be obtained.

MODE FOR CARRYING OUT THE INVENTION

Figure 1:
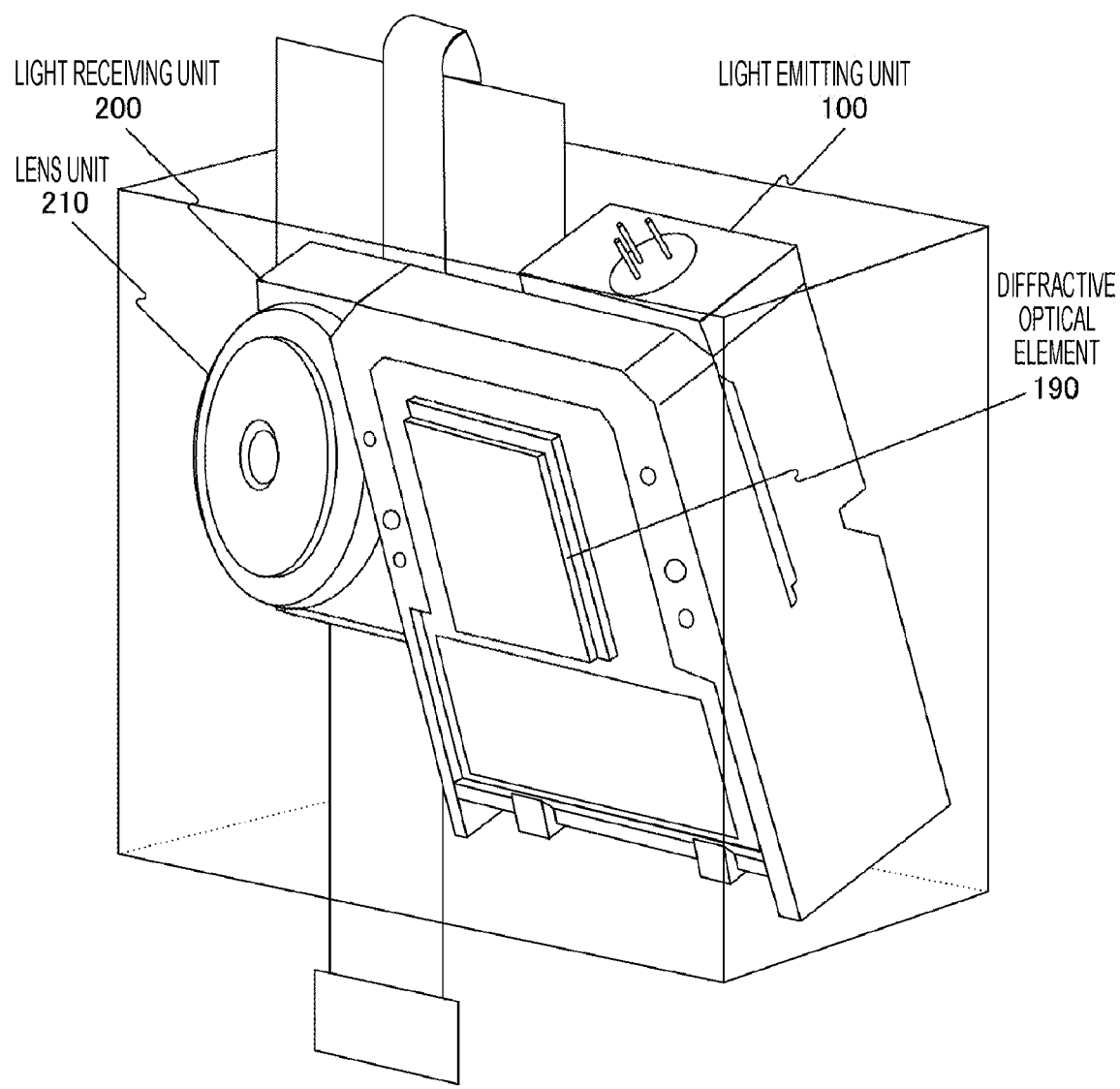
FIG. 1 illustrates an example of an overall structure of a distance measuring module in an embodiment of the present technology.

Hereinafter, modes for carrying out the present technology (hereinafter, referred to as "embodiments") will be described. Description will be made in the following order.
1. Overall structure
2. Distance measurement
3. Irradiation light
4. How to handle a case of 0th order light
5. Structures of light emitting unit 1. Overall Structure Distance Measuring Module FIG. 1 illustrates an example of an overall structure of a distance measuring module in an embodiment of the present technology. This distance measuring module mainly includes a light emitting unit 100 and a light receiving unit 200.

The light emitting unit 100 emits light with which a subject that is a target to be measured is irradiated.

The light emitting unit 100 includes a diffractive optical element (DOE) 190. The diffractive optical element 190 is an optical element that uses a diffraction phenomenon of light, and has a function of shaping irradiation light by forming a fine nano shape on an optical surface. In this embodiment, it is possible to shape irradiation light into a desired pattern shape by using the diffractive optical element 190.

The light receiving unit 200 receives light with which the subject has been irradiated. The light receiving unit 200 receives light via a lens unit 210, performs imaging in an imaging element inside the light receiving unit 200, and measures a distance on the basis of the principle of triangulation. A method of measuring a distance on the basis of the principle of triangulation is called a structured light method.

In this embodiment, when irradiation light is emitted toward the subject, the light emitting unit 100 vibrates the light, as described later. The light receiving unit 200 is configured to measure a distance in conjunction with the vibration.

Figure 2:
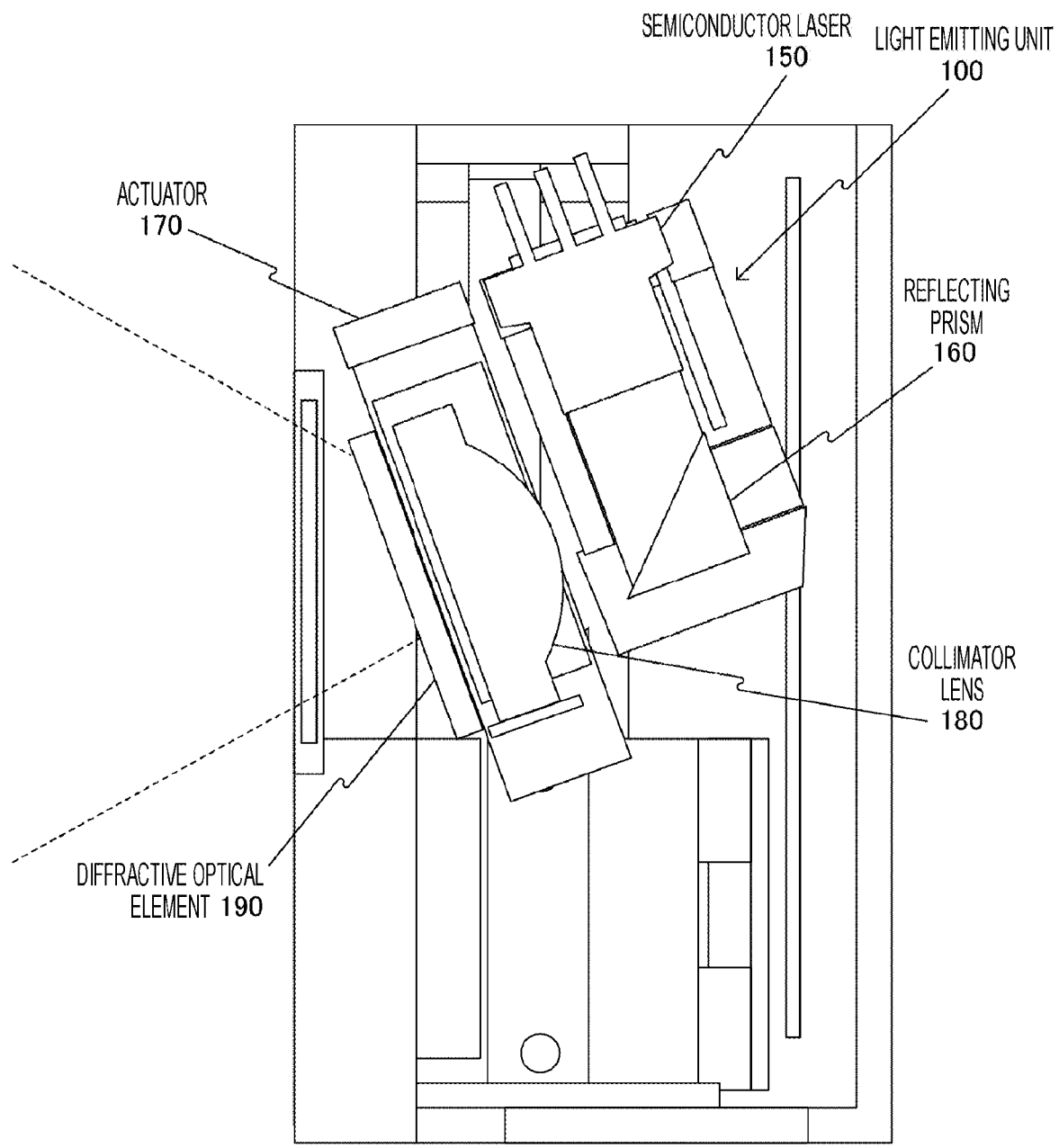
FIG. 2 is a side view illustrating an example of a structure of a light emitting unit 100 in an embodiment of the present technology.

FIG. 2 is a side view illustrating an example of a structure of the light emitting unit 100 in the embodiment of the present technology. The light emitting unit 100 includes a semiconductor laser 150, a reflecting prism 160, an actuator 170, a collimator lens 180, and the diffractive optical element 190.

The semiconductor laser 150 is a laser that uses recombination radiation in a semiconductor, and serves as a light source of the light emitting unit 100. A wavelength of this laser light source is assumed to be out of the visible range (400 to 700 nm). Note that the semiconductor laser 150 is an example of a laser generation unit recited in the claims. Note that the light source recited in the claims is not limited to the semiconductor laser 150, and various light sources such as a light emitting diode (LED) are applicable.

The reflecting prism 160 is a prism for refracting a laser beam from the semiconductor laser 150 by reflecting the laser beam so as to change a direction thereof. Therefore, the laser beam from the semiconductor laser 150 is supplied to the collimator lens 180. Further, because the reflecting prism 160 is provided, the light emitting unit 100 can be relatively small.

The collimator lens 180 converts a laser beam into substantially parallel light. That is, the laser beam becomes substantially parallel because of the collimator lens 180 and is incident on the diffractive optical element 190. The collimator lens 180 is an example of a collimator optical system recited in the claims. The collimator lens 180 may be, for example, a normal condensing optical lens, or may include another Fresnel type collimator (Fresnel lens). Note that the collimator lens 180 may be another component as long as the component converts a laser beam into substantially Parallel light, and, for example, an aspherical mirror may be used.

The actuator 170 is a mechanism for vibrating the collimator lens 180, and is assumed to be, for example, an actuator including a magnetic circuit or a piezoelectric element. In this embodiment, the actuator 170 may have a simple structure because it is unnecessary to scan the entire subject, as described later. Note that the actuator 170 is an example of a vibration unit recited in the claims.

Note that, in this example, a target to be controlled by the actuator 170 is assumed to be the collimator lens 180, but a structure such as another lens or a mirror may be the target to be controlled, as described later. For example, the actuator 170 may have a focus adjustment function that operates in an optical axis direction. In that case, the actuator 170 may have a position detection function in the optical axis direction for the focus adjustment.

Figure 3:
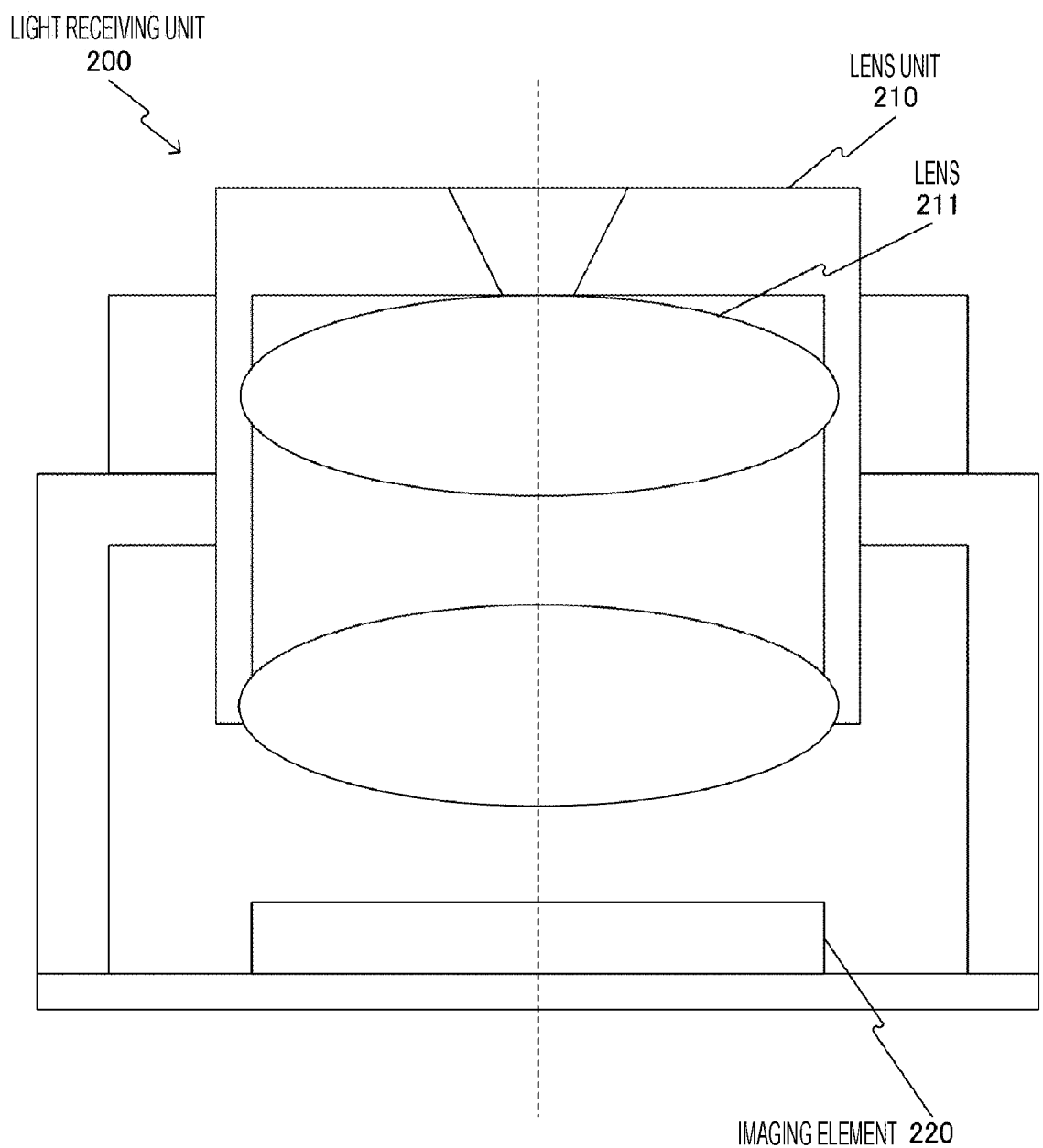
FIG. 3 is a cross-sectional view illustrating an example of a structure of a light receiving unit 200 in an embodiment of the present technology.

FIG. 3 is a cross-sectional view illustrating an example of a structure of the light receiving unit 200 in the embodiment of the present technology. The light receiving unit 200 includes the lens unit 210 and an imaging element 220.

The lens unit 210 is an optical component including a lens 211 that condenses light with which the subject is irradiated by the light emitting unit 100, and is realized as, for example, a lens group including a plurality of lenses incorporated in a lens barrel. The light condensed by the lens unit 210 forms an image on an imaging surface of the imaging element 220. Note that a lens surface of the lens unit 210 is subjected to antireflection coating, and this antireflection coat includes a film that transmits a wavelength of the light source used in the light emitting unit 100.

The imaging element 220 is an element that images the light condensed by the lens unit 210. An imaging signal imaged by the imaging element 220 is supplied to a signal processing circuit at a later stage. The imaging element 220 may be realized by, for example, a two-dimensional area sensor. More specifically, a charge coupled device (CCD) image sensor or a complementary metal oxide semiconductor (CMOS) image sensor can be assumed. The imaging element 220 has characteristics suitable for detecting a wavelength of light emitted by the semiconductor laser 150. For example, in a case where the semiconductor laser 150 emits infrared light, the imaging element 220 is configured to have high sensitivity to infrared light. For example, the imaging element 220 may include an imaging element including white pixels or clear pixels, and a visible light cut filter that transmits infrared light while blocking visible light. Further, the imaging element 220 may include an infrared sensor including a compound semiconductor such as indium gallium arsenide (InGaAs) or gallium arsenide (GaAs).

Functions

Figure 4:
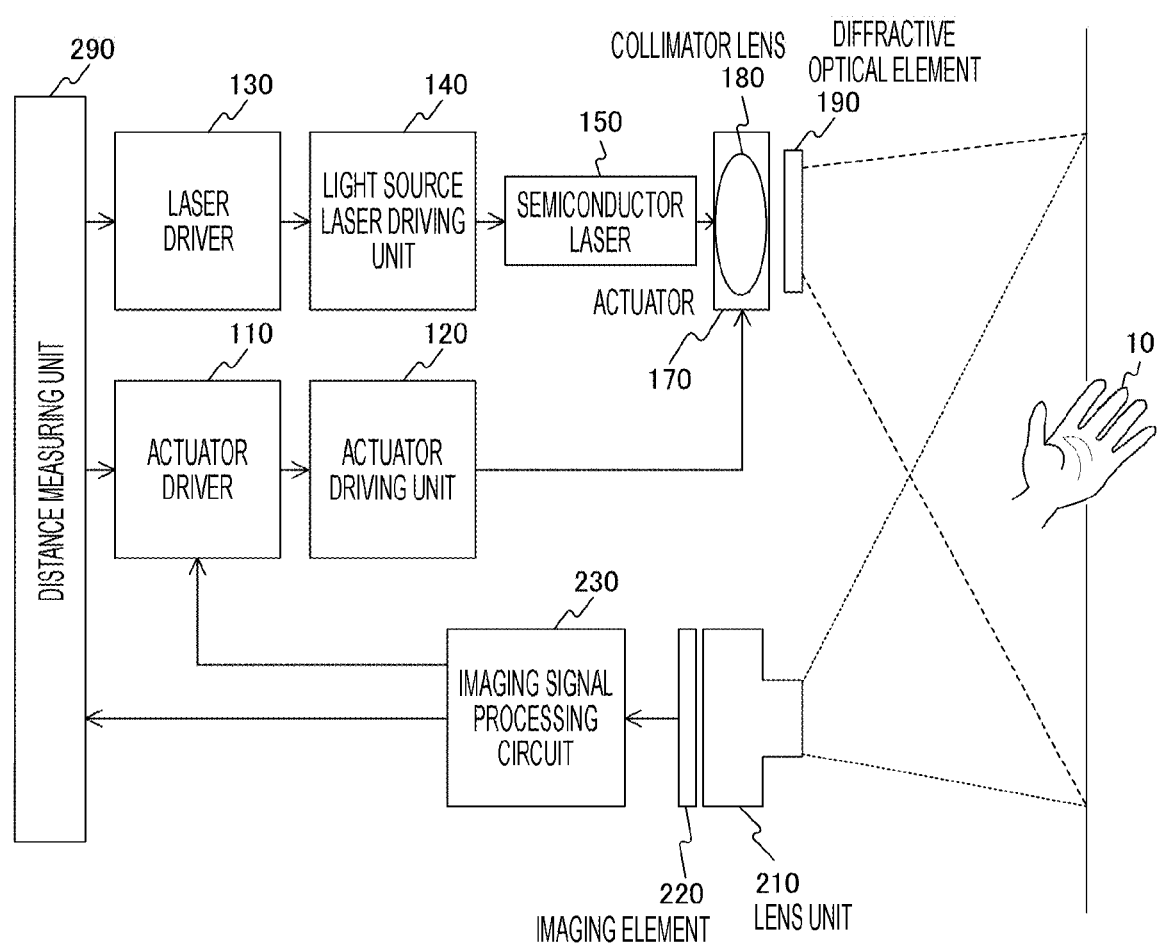
FIG. 4 illustrates an example of a functional configuration of a distance measuring module in an embodiment of the present technology.

FIG. 4 illustrates an example of a functional configuration of the distance measuring module in the embodiment of the present technology. Herein, FIG. 4 illustrates an example where gesture recognition of a human hand 10 serving as the subject is assumed. However, the present technology is not limited thereto and may be applied to, for example, face authentication or the like.

The light emitting unit 100 further includes an actuator driver 110, an actuator driving unit 120, a laser driver 130, and a light source laser driving unit 140 in addition to the above-described configuration. Further, the light receiving unit 200 further includes an imaging signal processing circuit 230 and a distance measuring unit 290 in addition to the above-described configuration.

The actuator driver 110 is a driver for controlling the actuator 170. The actuator driver 110 includes a Hall element (Hall sensor) for detecting a position of the target to be controlled, and can detect a position of the collimator lens 180. Note that the Hall element of the actuator driver 110 is an example of a position detection unit recited in the claims.

The actuator driving unit 120 drives the actuator 170 on the basis of the control of the actuator driver 110.

The laser driver 130 is a driver for controlling the semiconductor laser 150. The light source laser driving unit 140 drives the semiconductor laser 150 on the basis of the control of the laser driver 130.

The imaging signal processing circuit 230 is a circuit that performs predetermined signal processing on the imaging signal imaged by the imaging element 220. The imaging signal processing circuit 230 performs not only normal signal processing such as demosaic but also processing for performing imaging in conjunction with position detection in the actuator driver 110.

On the basis of the imaging signal of the light with which the subject has been irradiated, the distance measuring unit 290 measures a distance from the subject by using the principle of triangulation in accordance with unevenness of the subject. A specific distance measurement method will be described later.

2. Distance Measurement

Triangulation

Figure 5:
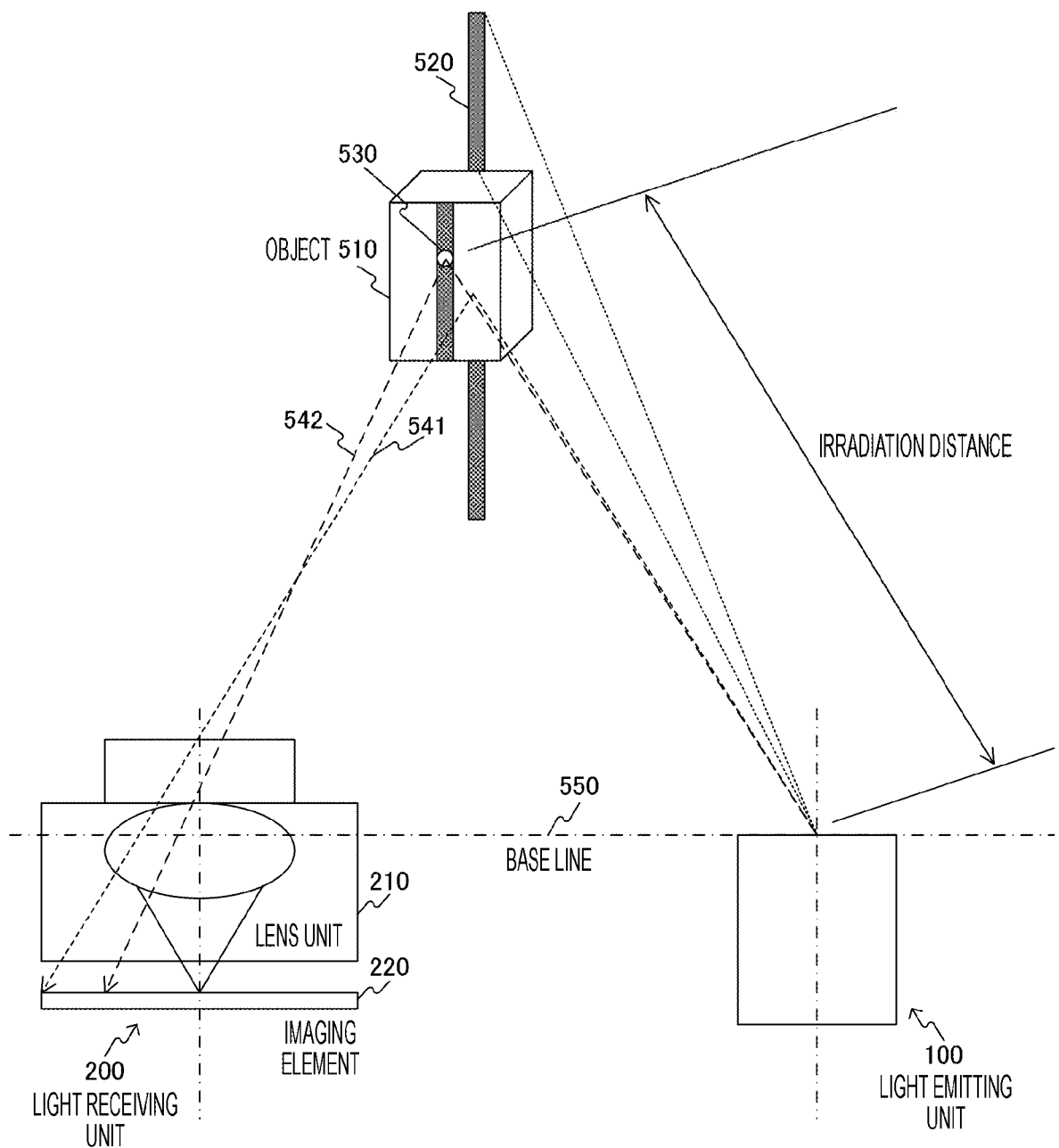
FIG. 5 illustrates a schematic example of distance measurement in an embodiment of the present technology.

FIG. 5 illustrates a schematic example of distance measurement in the embodiment of the present technology.

The distance measuring module emits line light beams 520 from the light emitting unit 100, performs imaging in the light receiving unit 200, and measures a distance. It is assumed that arrangement positions of the light emitting unit 100 and the light receiving unit 200 are fixed on a base line 550, and a position of the imaging surface of the imaging element 220 where position information of a specified irradiation distance reaches is known in advance.

In this example, an arrival position of reflected light 541 is known in a case where the line light beams 520 are emitted from the light emitting unit 100 and no object 510 exists. Herein, when the object 510 is arranged, a target 530 is shifted from a specified position. Thus, a position where reflected light 542 reaches the imaging surface of the imaging element 220 changes. A depth of the object 510 can be calculated by using triangulation on the basis of a difference in position change.

Figure 6:
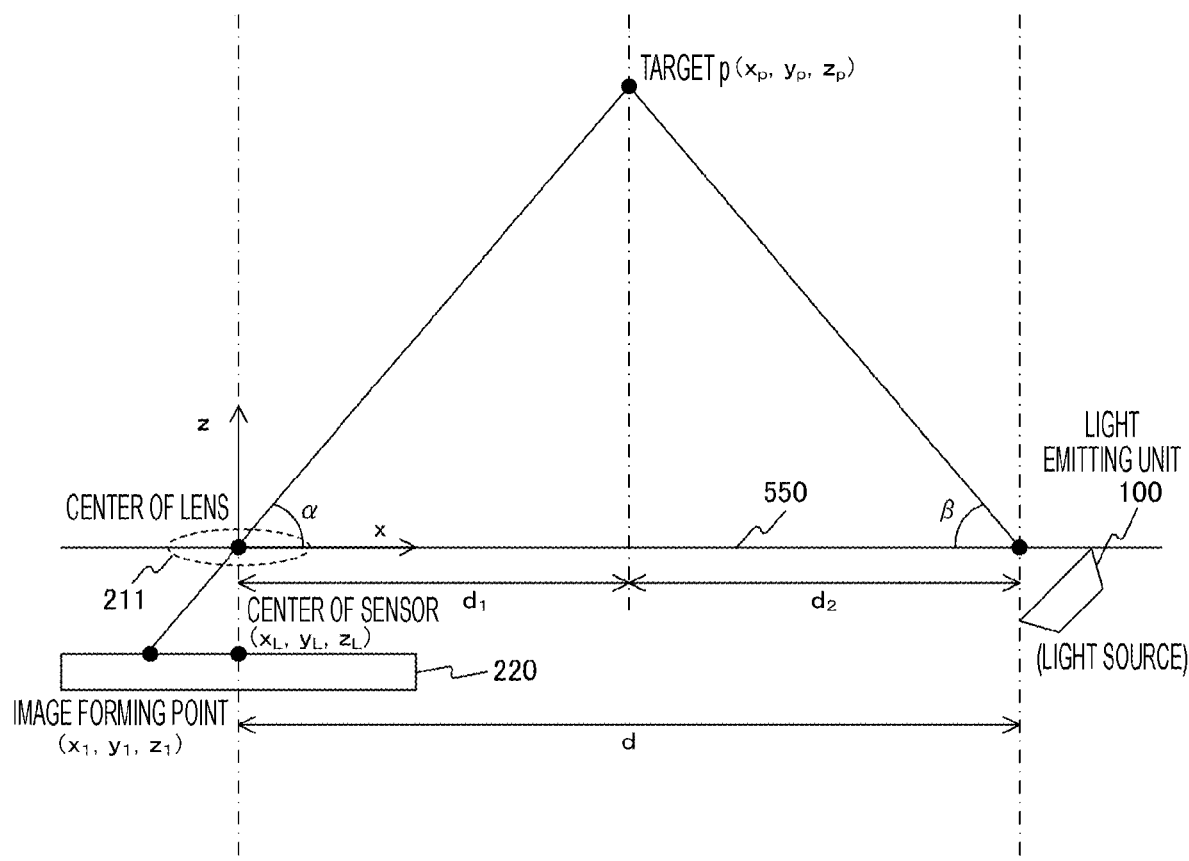
FIG. 6 illustrates a calculation example of distance measurement in an embodiment of the present technology.

FIG. 6 illustrates a calculation example of distance measurement in the embodiment of the present technology.

As described above, it is assumed that a target p is irradiated with light from the light emitting unit 100, imaging is performed in the light receiving unit 200, and a distance is measured on the basis of triangulation. A horizontal direction is defined as an x direction, a vertical direction is defined as a y direction, and a depth direction is defined as a z direction. FIG. 6 is a view seen from the vertical direction. A three-dimensional coordinate position of the target p is defined as $(x_p, y_p, z_p)$, a center position of the imaging surface of the imaging element 220 is defined as $(x_L, y_L, z_L)$, and an image forming point is defined as $(x_1, y_1, z_1)$.

Herein, a distance on the base line 550 from the light emitting unit 100 to the target p is defined as $d_1$, and a distance on the base line 550 from the light receiving unit 200 to the target p is defined as $d_2$. Therefore, a distance between the light emitting unit 100 and an axis of the light receiving unit 200, in other words, a base line length d equals to $d_1+d_2$. In addition, an angle from the base line 550 obtained when the target p is seen from the light receiving unit 200 is defined as α, and an angle from the base line 550 obtained when the target p is seen from the light emitting unit 100 is defined as β. Further, a focal length of the lens group of the light receiving unit 200 is defined as f.

At this time, $$\tan \alpha = z_p/d_1$$

$$\tan \beta = z_p/d_2$$

are satisfied. Therefore, the following expression is established.

$$d = d_1 + d_2 = z_p/\tan \alpha + z_p/\tan \beta$$

When the above expression is multiplied by "tan α·tan β", the following expression is established.

$$d(\tan \alpha \cdot \tan \beta) = z_p(\tan \alpha + \tan \beta)$$

$$z_p = d(\tan \alpha \cdot \tan \beta)/(\tan \alpha + \tan \beta)$$

Herein, when $\tan \alpha = f/x_1$ is substituted, the following expression is established.

$$z_p = d((f/x_1)\tan \beta)/((f/x_1)+\tan \beta) = df \tan \beta/(f+x_1 \tan \beta)$$

In the above expression, d, f, and β are known numerical values. Thus, if the image forming point on the imaging surface of the imaging element 220 is known, a position of the target p can be grasped. Note that this principle is also called a light section method among the structured light methods. Note that the embodiment of the present technology is not limited to the light section method, and various structured light methods such as a spatial coding method and a pattern simultaneous projection method can be employed.

3. Irradiation Light

Interpolation by Vibration

Figure 7:
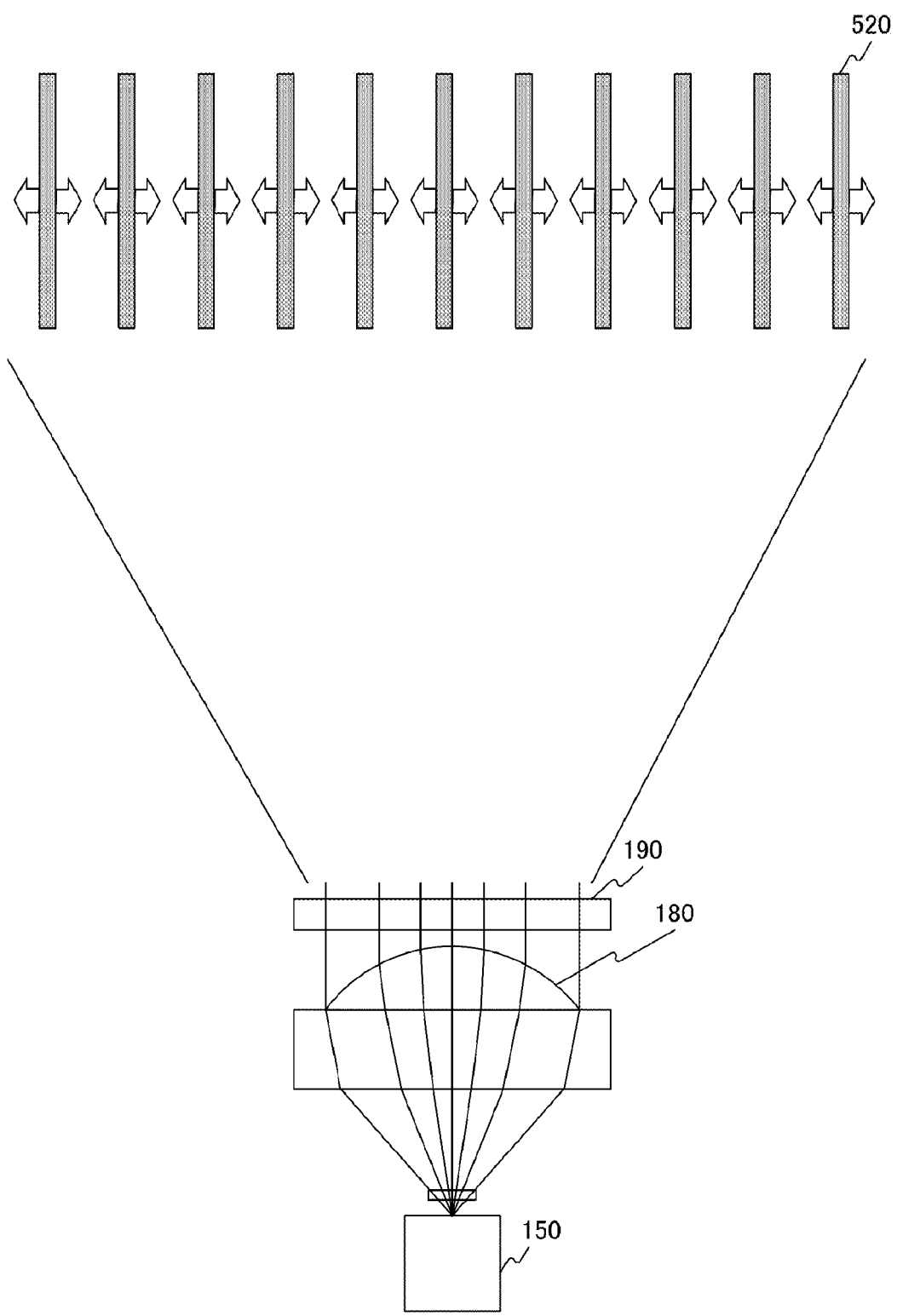
FIG. 7 illustrates an example of irradiation with line light beams in an embodiment of the present technology.

FIG. 7 illustrates an example of irradiation with line light beams in the embodiment of the present technology.

A laser beam from the semiconductor laser 150 is converted into substantially parallel light by the collimator lens 180 and is shaped into a pattern shape by the diffractive optical element 190. In this example, a plurality of line light beams 520 is assumed to be formed at predetermined intervals and be emitted.

In the related art, line light beams are scanned over the entire subject by rotating the scanning mirror, and thus actuator control is large in scale and is complicated. Meanwhile, in this embodiment, the pattern-shaped light beams formed by the diffractive optical element 190 are slightly vibrated by the actuator 170, thereby increasing a scanning range of each light beam. That is, vibration by the actuator 170 is a simple movement in a single axial direction, and thus the actuator 170 does not require a large amount of power, consumes less power, and can be incorporated in a small device.

Figure 8:
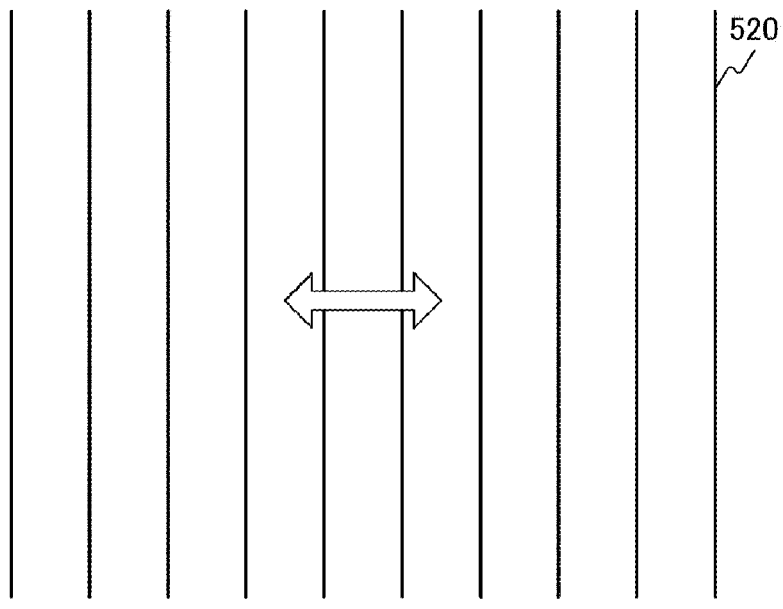
FIG. 8 illustrates an example of interpolation of line light beams in an embodiment of the present technology.
Figure 8:
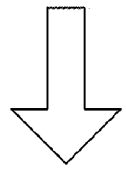
Figure 8:
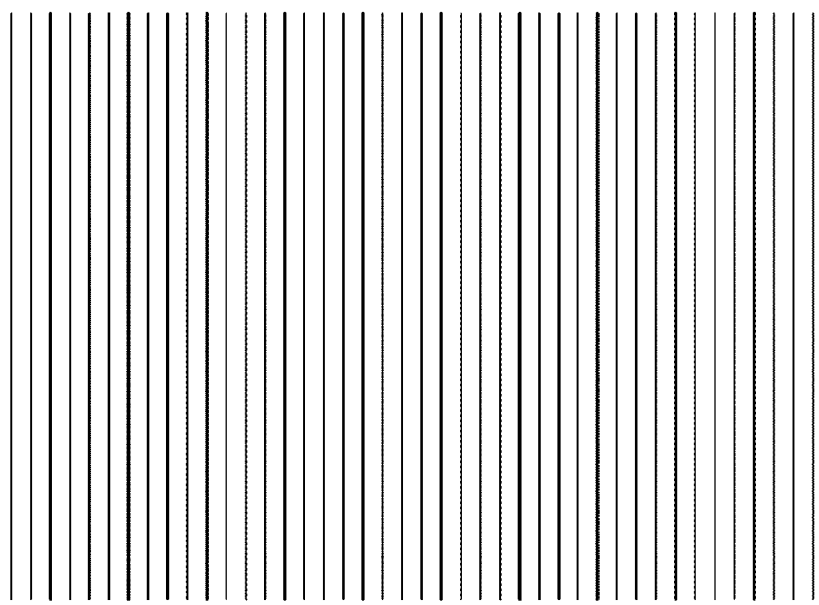

FIG. 8 illustrates an example of interpolation of line light beams in the embodiment of the present technology.

As described above, in this embodiment, by causing the actuator 170 to slightly vibrate the plurality of line light beams 520 formed by the diffractive optical element 190 at the predetermined intervals, the scanning range can be increased while tracing a surface of the target subject. For example, the actuator 170 vibrates the collimator lens 180 from the near side to the far side, thereby vibrating the line light beams 520 from side to side. Therefore, the scanning range can be increased to recognize fine unevenness between patterns, and thus it is possible to obtain an effect similar to that obtained in a case where gaps between the plurality of line light beams 520 are interpolated as illustrated in FIG. 8.

In order to interpolate intervals between the line light beams 520 by vibrating the line light beams 520 as described above, it is desirable to vibrate the line light beams 520 so that a width of the interval between the line light beams 520 is equal to or less than their amplitude. It is more desirable to vibrate the line light beams 520 so that the width of the interval between the line light beams 520 is the minimum amplitude. Therefore, the scanning range can be covered as a plane.

Further, it is useful to vibrate the line light beams 520 in a direction orthogonal to a direction of the line light beams 520. A specific relationship with a pattern shape will be described later.

Pattern Shape

Figure 9:
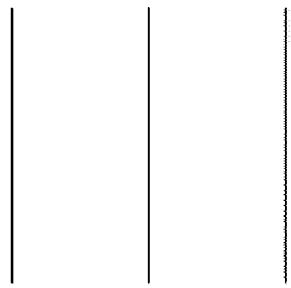
FIG. 9 illustrates an example of a pattern shape of irradiation light in an embodiment of the present technology.
Figure 9:
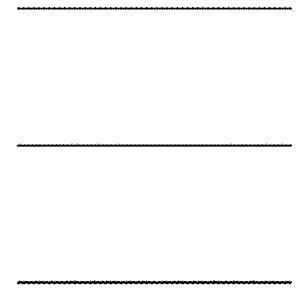
Figure 9:
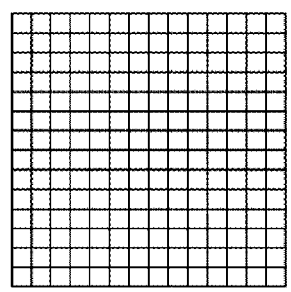
Figure 9:
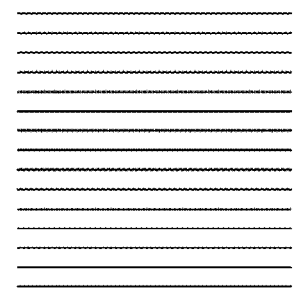
Figure 9:
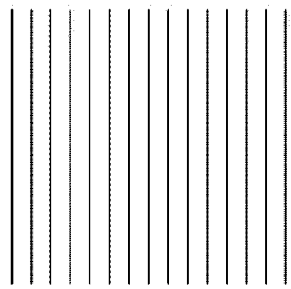
Figure 9:
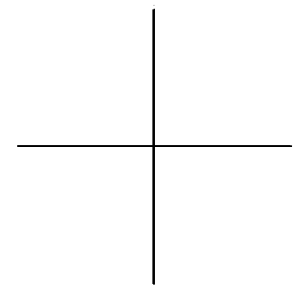

FIG. 9 illustrates examples of a pattern shape of irradiation light in the embodiment of the present technology. As described above, the diffractive optical element 190 can shape irradiation light by forming a fine nano shape on the optical surface. The following are examples of the pattern shape of the irradiation light to be formed, but other shapes may be used.

In FIG. 9, a and e are examples where a plurality of vertical line light beams is formed. In this case, in order to increase the scanning range, it is useful to vibrate the line light beams in a lateral direction that is a direction in which the line light beams are divided. Meanwhile, b and d in FIG. 9 are examples where a plurality of lateral line light beams is formed. In this case, in order to increase the scanning range, it is useful to vibrate the line light beams in a vertical direction that is a direction in which the line light beams are divided.

Further, c and f in FIG. 9 are examples where line light beams are formed in both the vertical direction and the lateral direction, and, in particular, c forms a lattice shape. In this case, in order to increase the scanning range, the line light beams may be vibrated in either the lateral direction or the vertical direction, or may be vibrated in both the directions. Note that the line light beams in the embodiment of the present technology are not limited to linear light beams, and may be curved light beams. For example, each line light beam may have a plurality of curves having a predetermined pattern, or may have a curve having a random shape.

4. How to Handle a Case of 0th Order Light

0th Order Light

Figure 10:
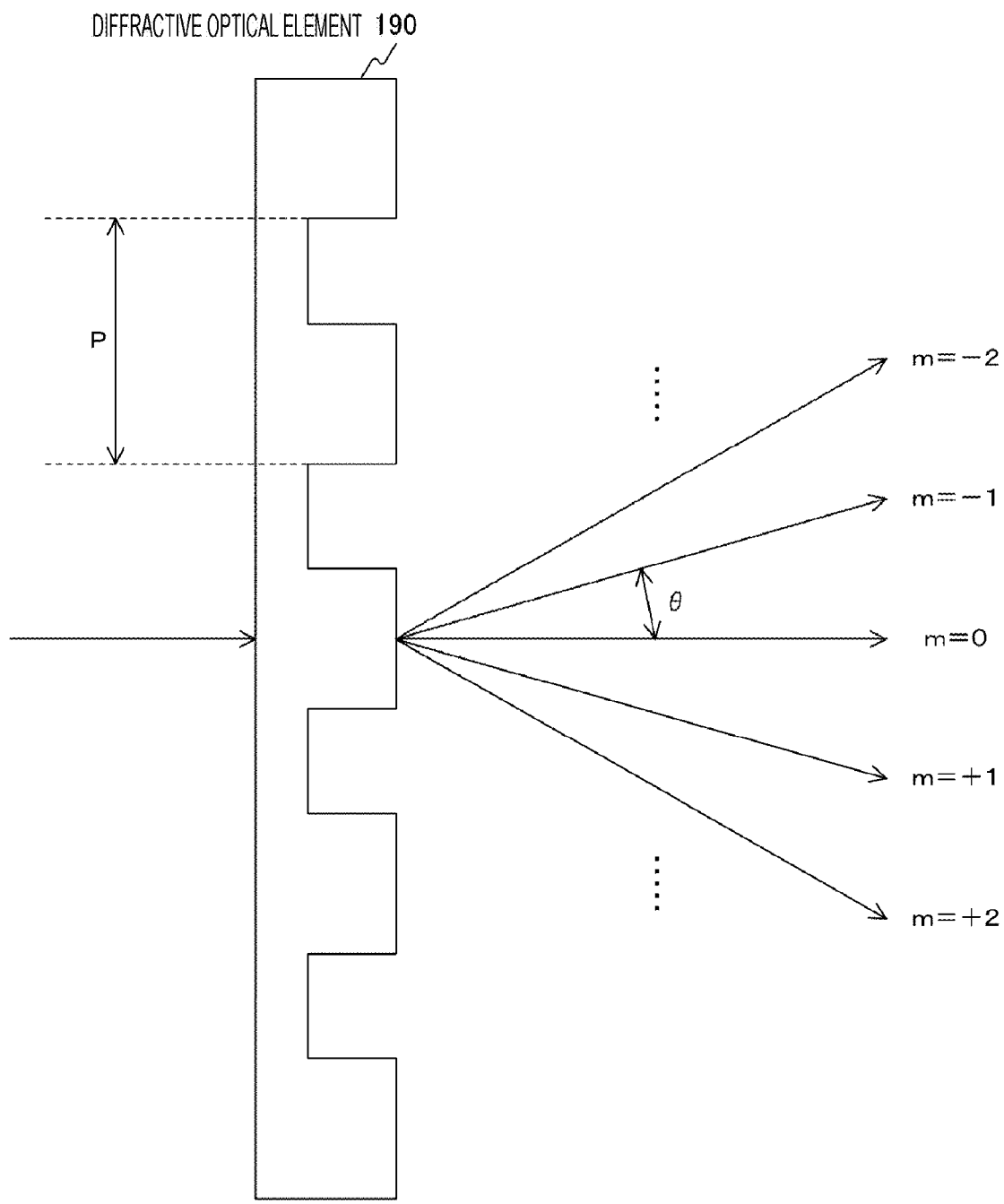
FIG. 10 illustrates an optical path of light formed by a diffractive optical element 190 in an embodiment of the present technology.

FIG. 10 illustrates an optical path of light formed by the diffractive optical element 190 in the embodiment of the present technology.

When an incident angle of incident light of the diffractive optical element 190 is defined as φ and a diffraction angle of diffracted light by the diffractive optical element 190 is defined as θ, the following expression is generally established.

$$P \times (\sin \varphi - \sin \theta) = m\lambda$$

Herein, P represents an aperture interval of the diffractive optical element 190, λ represents a wavelength, and m represents the diffraction order (integer value).

In this example, assuming that the incident light is vertically incident, $$\theta \approx \lambda/P$$

is established. At this time, the 0th order light of m=0 appears in a normal direction perpendicular to the surface of the diffractive optical element 190. The 0th order light has high luminance, which may cause erroneous recognition in distance measurement.

Figure 11:
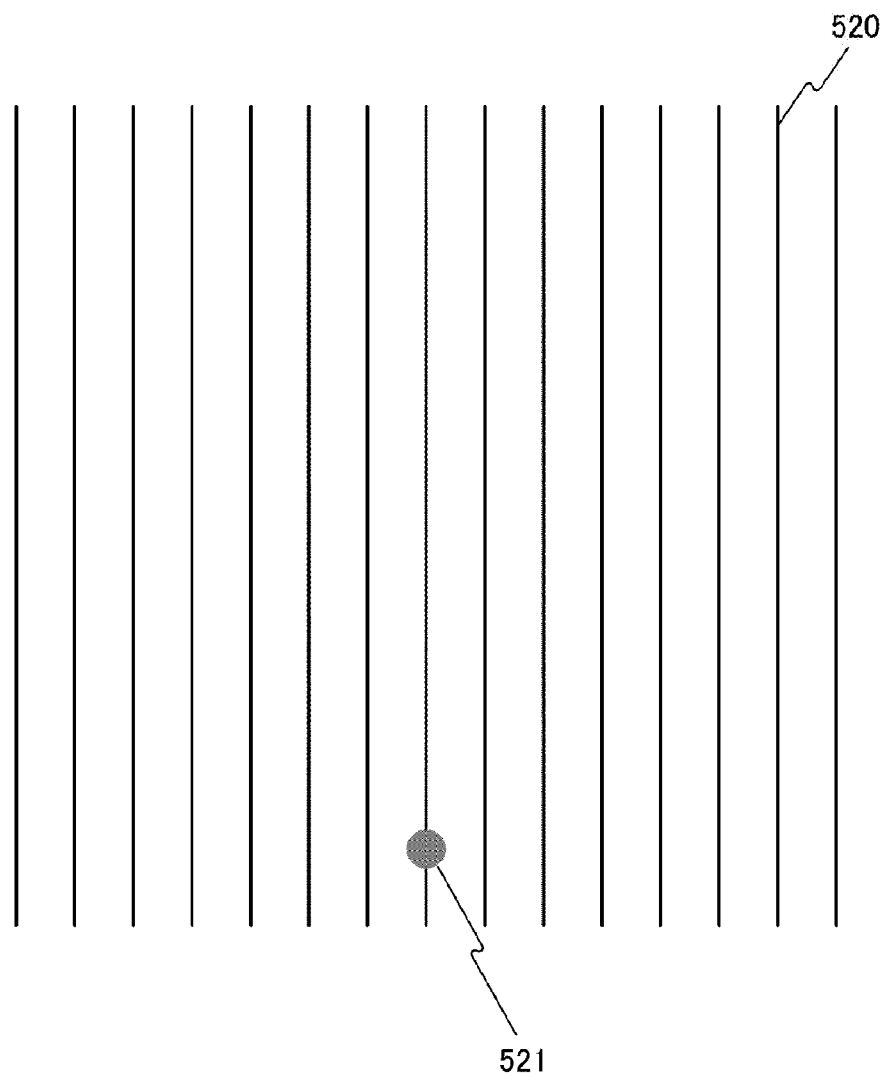
FIG. 11 illustrates an example of line light beams 520 and 0th order light 521 formed by the diffractive optical element 190 in an embodiment of the present technology.

FIG. 11 illustrates an example of the line light beams 520 and 0th order light 521 formed by the diffractive optical element 190 in the embodiment of the present technology.

As described above, the 0th order light has high luminance, which may cause erroneous recognition in distance measurement. In particular, an important subject is highly likely to exist at a center position of a distance measurement range. Thus, if the 0th order light appears in the area, the 0th order light may cause disturbance at the time of measuring a distance.

In view of this, in this embodiment, an optical axis of the diffractive optical element 190 is inclined with respect to the imaging surface of the imaging element 220. Therefore, the 0th order light 521 can be shifted from the center position of the distance measurement range. Further, because an aspect ratio of an angle of view of a normal imaging device is horizontally long, for example, 16 to 9, or the like, in many cases, the 0th order light 521 can also be excluded from the distance measurement range (angle of view) by shifting the optical axis. Therefore, it is possible to improve measurement accuracy by eliminating the element that causes disturbance at the time of measuring a distance. Further, as illustrated in FIG. 1, the diffractive optical element 190 and the imaging element 220 are integrally formed in a state where the optical axis of the diffractive optical element 190 is inclined with respect to the imaging surface of the imaging element 220. Specifically, the diffractive optical element 190 and the imaging element 220 may be arranged in a common housing. Alternatively, a housing including the diffractive optical element 190 and a housing including the imaging element 220 may be fixed to each other. With this configuration, an angle of the imaging surface of the imaging element 220 from the optical axis of the diffractive optical element 190 becomes constant. This makes it possible to improve distance measurement accuracy. Further, the housing including the diffractive optical element 190 and the housing including the imaging element 220 may be rotatable about a common axis. With this configuration, the optical axis can be shifted to an arbitrary position, thereby adjusting a position of the 0th order light 521.

Note that the distance measuring module including the diffractive optical element 190 has a function of correcting deformation and distortion of an irradiation pattern shape caused by inclining the optical axis.

Figure 12:
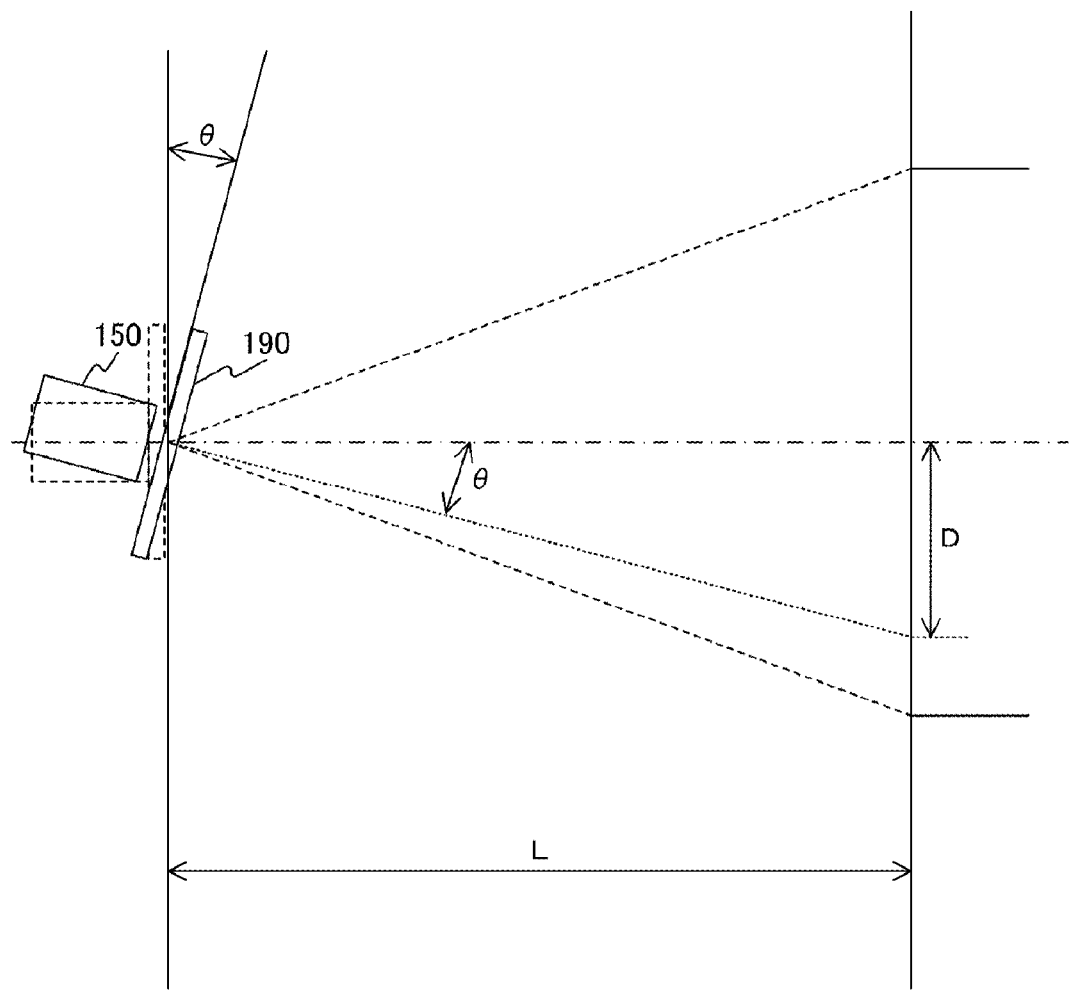
FIG. 12 illustrates an example of an installation angle of the diffractive optical element 190 in an embodiment of the present technology.

FIG. 12 illustrates an example of an installation angle of the diffractive optical element 190 in the embodiment of the present technology.

In this example, a distance between the diffractive optical element 190 and the irradiation surface is defined as L. Assuming that the optical axis is inclined from a center position on the irradiation surface to a position at a distance D, an inclination θ thereof is calculated by the following expression.

$$\theta = a \tan(D/L)$$

At this time, in a case where the imaging surface of the imaging element 220 and the irradiation surface are installed in parallel, a relative inclination of the imaging element 220 and the diffractive optical element 190 is also represented by θ. Thus, the diffractive optical element 190 is installed so that the optical axis is inclined with the inclination θ with respect to the imaging surface of the imaging element 220.

5. Structures of Light Emitting Unit

First Structure Example

Figure 13:
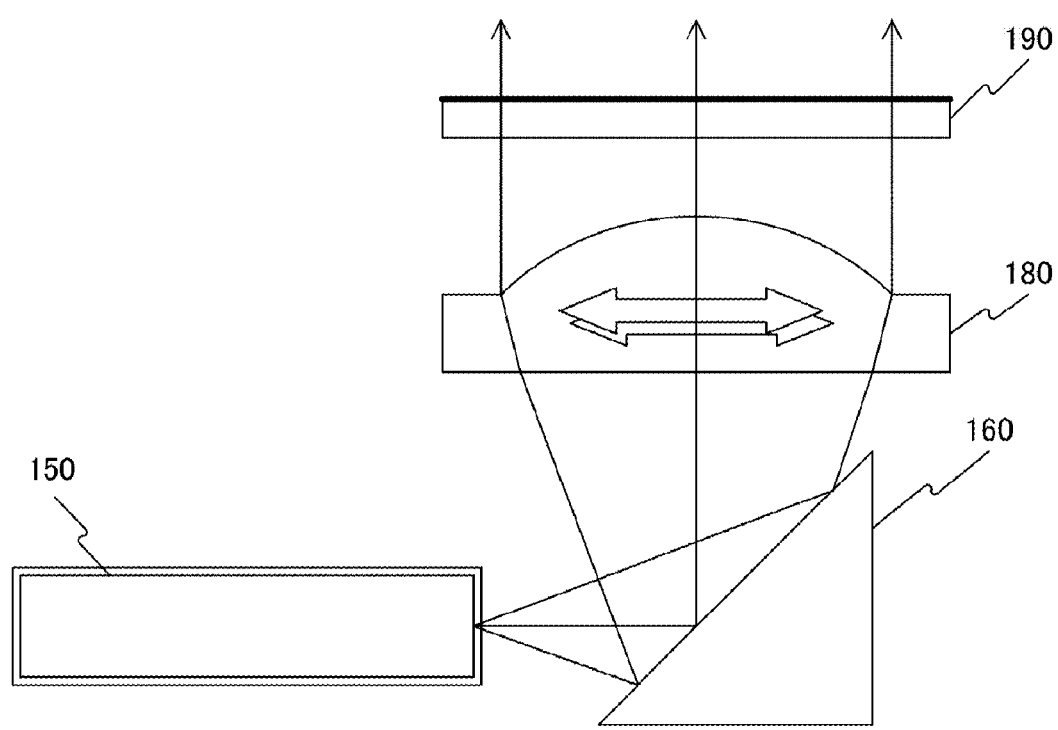
FIG. 13 illustrates a first structure example of the light emitting unit 100 in an embodiment of the present technology.

FIG. 13 illustrates a first structure example of the light emitting unit 100 in the embodiment of the present technology.

The first structure example of the light emitting unit 100 is assumed to be the above-described embodiment, and the reflecting prism 160 reflects a laser beam from the semiconductor laser 150 and supplies the laser beam to the collimator lens 180. The collimator lens 180 converts the laser beam into substantially parallel light and supplies the substantially parallel light to the diffractive optical element 190. Then, the actuator 170 vibrates the collimator lens 180 to vibrate the substantially parallel light.

Second Structure Example

Figure 14:
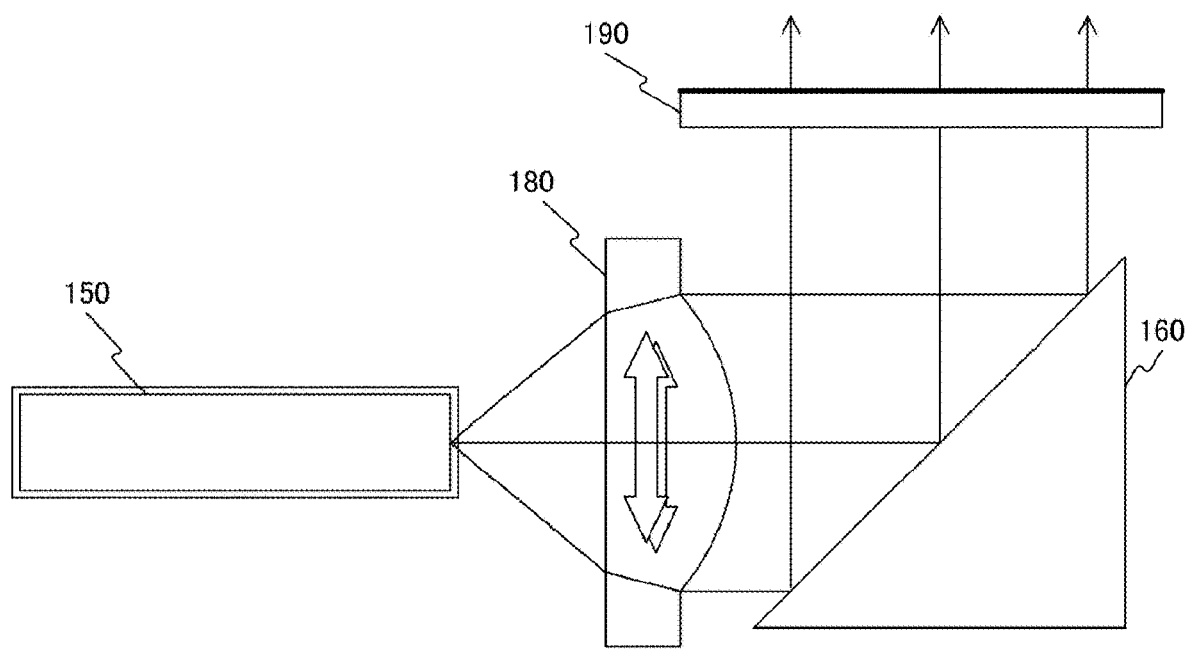
FIG. 14 illustrates a second structure example of the light emitting unit 100 in an embodiment of the present technology.

FIG. 14 illustrates a second structure example of the light emitting unit 100 in the embodiment of the present technology.

In the second structure example of the light emitting unit 100, a laser beam from the semiconductor laser 150 is first supplied to the collimator lens 180. Then, the collimator lens 180 converts the laser beam into substantially parallel light and supplies the substantially parallel light to the diffractive optical element 190 via the reflecting prism 160. Also in the second structure example, the actuator 170 vibrates the collimator lens 180 to vibrate the substantially parallel light.

Third Structure Example

Figure 15:
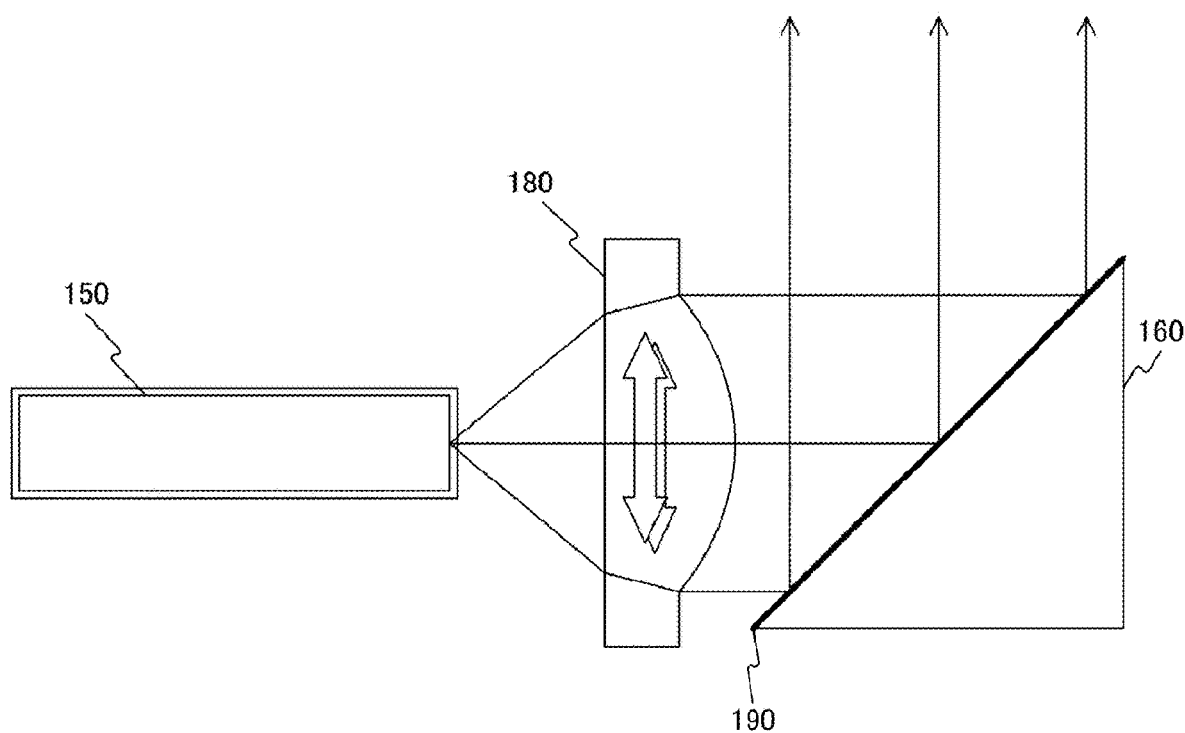
FIG. 15 illustrates a third structure example of the light emitting unit 100 in an embodiment of the present technology.

FIG. 15 illustrates a third structure example of the light emitting unit 100 in the embodiment of the present technology.

In the third structure example of the light emitting unit 100, similar to the second structure example, a laser beam from the semiconductor laser 150 is first supplied to the collimator lens 180. In the third structure example, the diffractive optical element 190 is provided on the surface of the reflecting prism 160. Thus, substantially parallel light from the collimator lens 180 is refracted by the reflecting prism 160, and a pattern shape is formed by the diffractive optical element 190 provided on the surface thereof.

Fourth Structure Example

Figure 16:
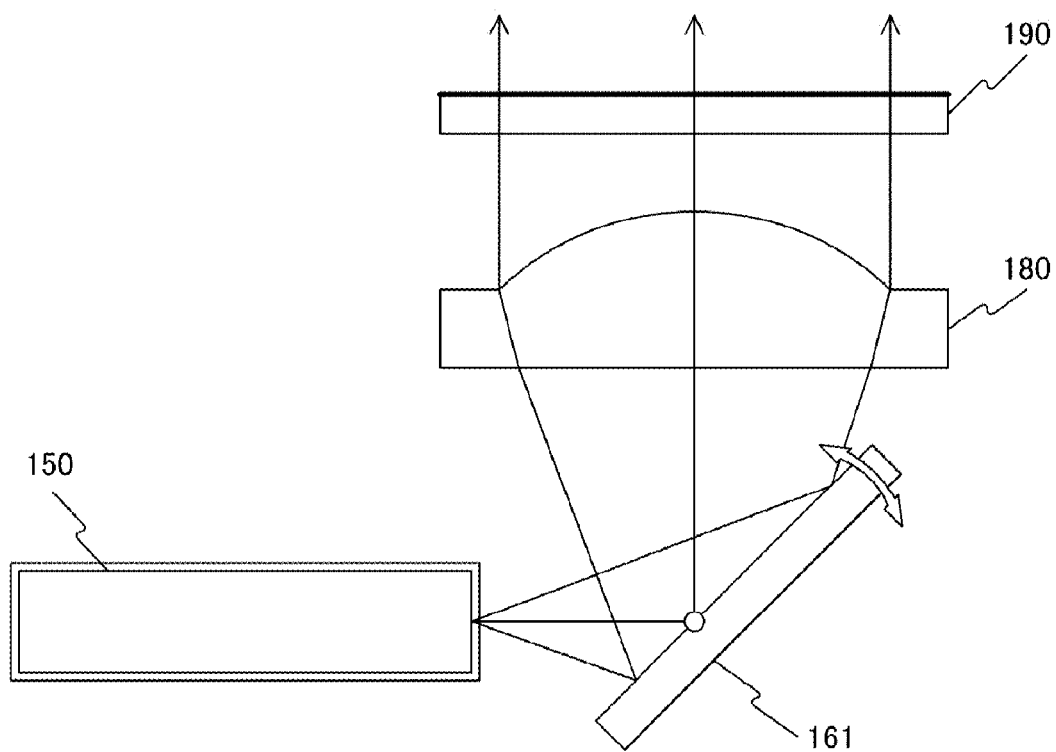
FIG. 16 illustrates a fourth structure example of the light emitting unit 100 in an embodiment of the present technology.

FIG. 16 illustrates a fourth structure example of the light emitting unit 100 in the embodiment of the present technology.

In the fourth structure example of the light emitting unit 100, unlike the first structure example described above, a plate-like reflecting mirror 161 is provided instead of the reflecting prism 160. The reflecting mirror 161 reflects a laser beam from the semiconductor laser 150 and supplies the laser beam to the collimator lens 180. The collimator lens 180 converts the laser beam into substantially parallel light and supplies the substantially parallel light to the diffractive optical element 190. In the fourth structure example, an angle of the reflecting mirror 161 is changeable, and the angle can be changed by the actuator 170. This brings about an effect similar to that obtained in a case where the collimator lens 180 is vibrated.

Fifth Structure Example

Figure 17:
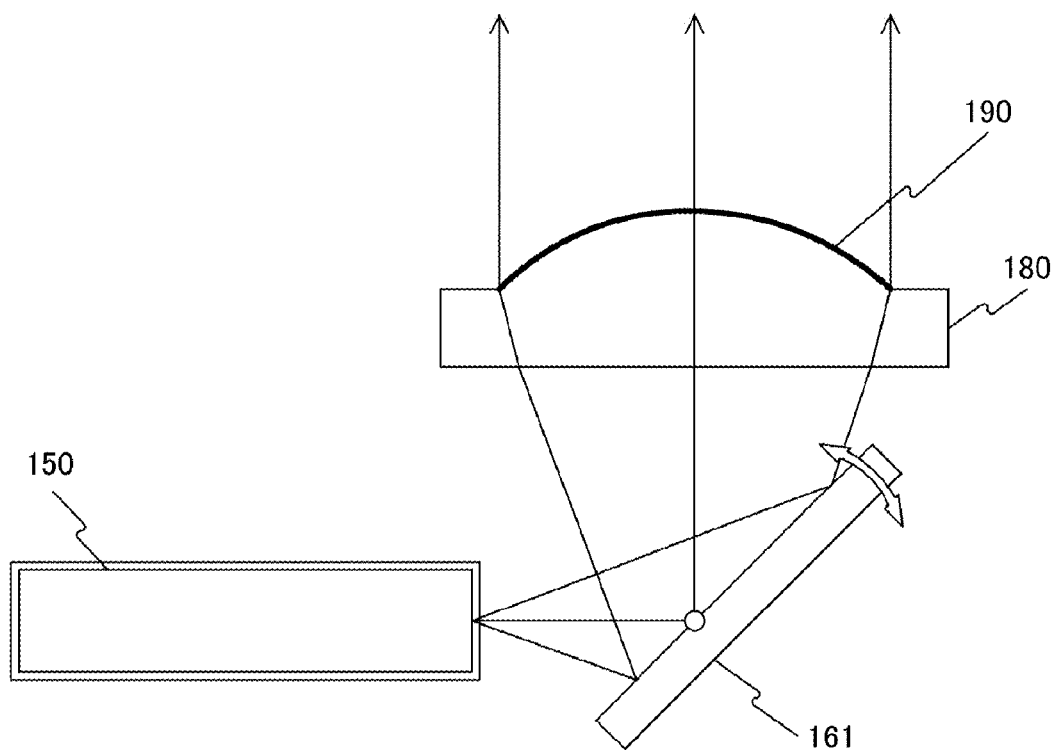
FIG. 17 illustrates a fifth structure example of the light emitting unit 100 in an embodiment of the present technology.

FIG. 17 illustrates a fifth structure example of the light emitting unit 100 in the embodiment of the present technology.

In the fifth structure example of the light emitting unit 100, similar to the fourth structure example described above, the plate-like reflecting mirror 161 is provided instead of the reflecting prism 160. Further, the diffractive optical element 190 is provided on the surface of the collimator lens 180, and both are integrally formed. Also in this example, the angle of the reflecting mirror 161 is changeable, and the angle can be changed by the actuator 170. This brings about an effect similar to that obtained in the case where the collimator lens 180 is vibrated.

Sixth Structure Example

Figure 18:
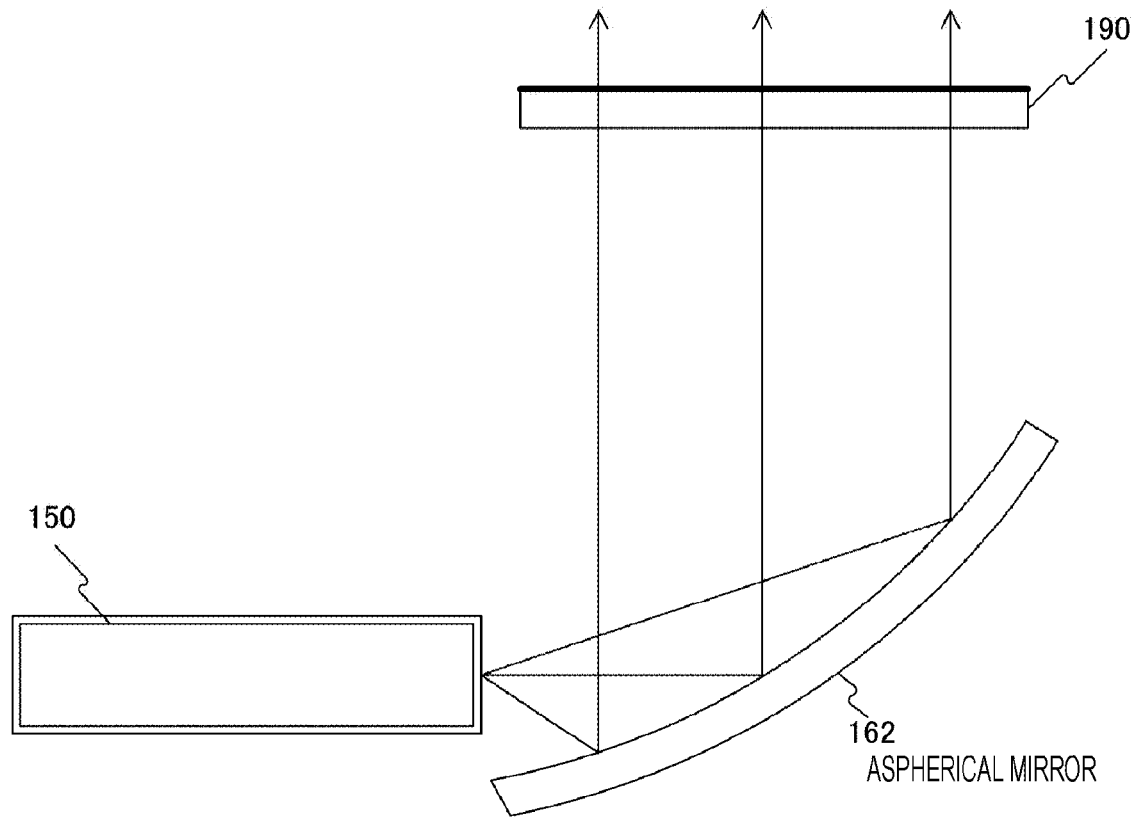
FIG. 18 illustrates a sixth structure example of the light emitting unit 100 in an embodiment of the present technology.

FIG. 18 illustrates a sixth structure example of the light emitting unit 100 in the embodiment of the present technology.

In the sixth structure example of the light emitting unit 100, an aspherical mirror 162 is provided instead of the reflecting mirror 161, as compared with the fourth structure example described above. The aspherical mirror 162 reflects a laser beam from the semiconductor laser 150 as substantially parallel light and supplies the substantially parallel light to the diffractive optical element 190. Therefore, the collimator lens 180 used in the fourth structure example can be eliminated. Thus, the number of parts can be reduced.

Seventh Structure Example

Figure 19:
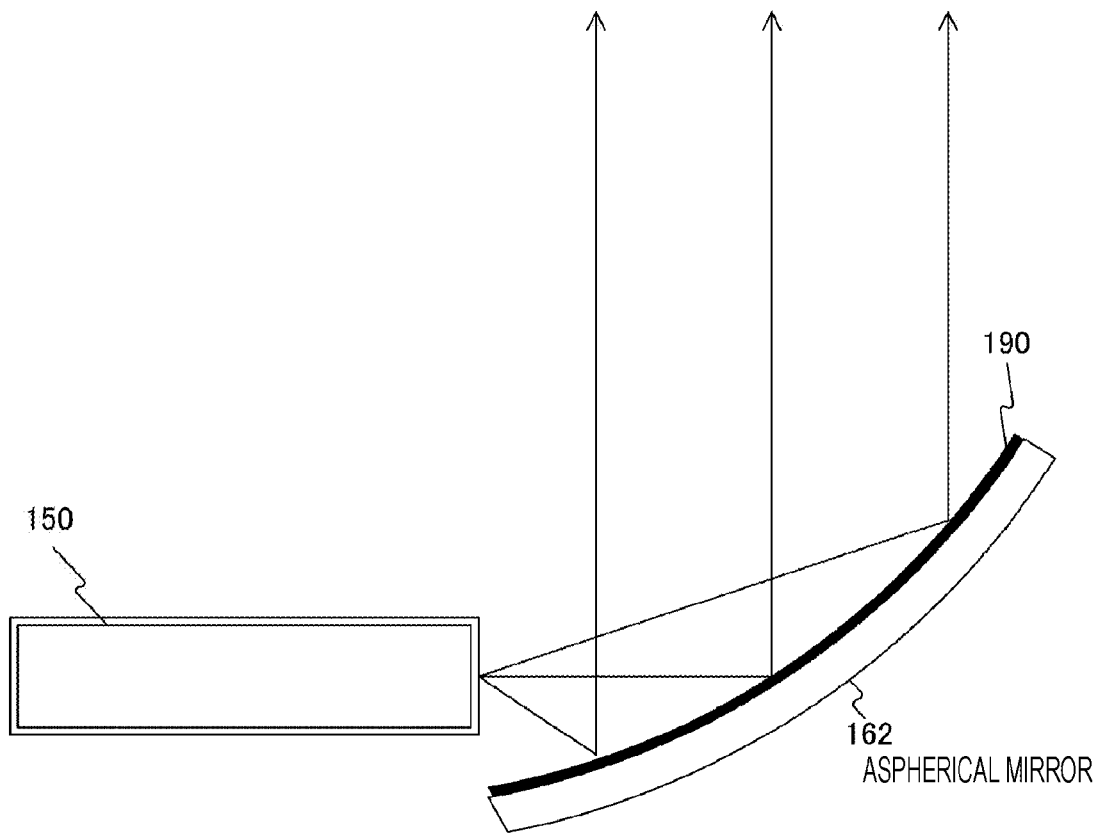
FIG. 19 illustrates a seventh structure example of the light emitting unit 100 in an embodiment of the present technology.

FIG. 19 illustrates a seventh structure example of the light emitting unit 100 in the embodiment of the present technology.

In the seventh structure example of the light emitting unit 100, the aspherical mirror 162 is provided instead of the reflecting mirror 161, as compared with the fifth structure example described above. The aspherical mirror 162 reflects a laser beam from the semiconductor laser 150 as substantially parallel light and supplies the substantially parallel light to the diffractive optical element 190, similar to the sixth structure example described above. Therefore, the collimator lens 180 provided together with the diffractive optical element 190 in the fifth structure example can be eliminated. Thus, the number of parts can be reduced.

Note that, in the first to seventh structure examples, an optical path is bent by the reflecting prism 160, the reflecting mirror 161, or the aspherical mirror 162. This contributes to reduction in size of the entire device.

As described above, the embodiment of the present technology is configured to form line light beams by using the diffractive optical element 190, irradiate the subject with the line light beams, image the subject, and measure a distance from the subject on the basis of the principle of triangulation. Therefore, distance measurement can be performed with a simple structure. Further, the simple actuator 170 vibrates irradiation light to interpolate the line light beams, and thus the actuator 170 and control thereof can be simplified. Therefore, the distance measuring module can be reduced in size and power consumption.

Note that the above-described embodiment shows an example for embodying the present technology, and the matters in the embodiment and the matters specifying the invention in the claims have a corresponding relationship. Similarly, each matter specifying the invention in the claims and each matter in the embodiment of the present technology having the same name have a corresponding relationship. However, the present technology is not limited to the embodiment, and can be embodied by making various modifications to the embodiment without departing from the scope of the present technology.

Note that the effects described in the present specification are merely illustrative and are not limited. Further, additional effects may be obtained.

Note that the present technology can also have the following configurations.

(1) A distance measuring module including:
a diffractive optical element that emits a predetermined number of line light beams;
an imaging element that images the line light beams with which a subject is irradiated; and
a distance measuring unit that measures a distance from the subject by using triangulation on the basis of the imaged line light beams.

(2) The distance measuring module according to (1), further including a light source that supplies substantially parallel light to the diffractive optical element.

(3) The distance measuring module according to (2), in which the light source includes a laser generation unit that generates a laser beam, and a collimator optical system that converts the laser beam from the laser generation unit into the substantially parallel light.

(4) The distance measuring module according to (3), in which the light source further includes a vibration unit that vibrates the substantially parallel light, and the imaging element images the line light beams in conjunction with the vibration.

(5) The distance measuring module according to (4), in which the vibration unit vibrates the substantially parallel light in a direction orthogonal to a direction of the line light beams.

(6) The distance measuring module according to (4) or (5), in which the vibration unit vibrates the substantially parallel light so that its amplitude is larger than a width of an interval between the line light beams.

(7) The distance measuring module according to any one of (4) to (6), further including a position detection unit that detects a position of an object to be vibrated by the vibration unit, in which the imaging element performs imaging in conjunction with the vibration, in accordance with the detected position.

(8) The distance measuring module according to any one of (4) to (7), in which the vibration unit vibrates the substantially parallel light by vibrating the collimator optical system.

(9) The distance measuring module according to any one of (4) to (7), in which the vibration unit vibrates the substantially parallel light by vibrating the laser beam from the laser generation unit.

(10) The distance measuring module according to any one of (4) to (7), in which the collimator optical system is a collimator lens, and the light source further includes a reflecting mirror that reflects the laser beam from the laser generation unit and guides the laser beam to the collimator lens.

(11) The distance measuring module according to (10), in which the vibration unit vibrates the substantially parallel light by changing an angle of the reflecting mirror.

(12) The distance measuring module according to any one of (4) to (11), in which the vibration unit includes an actuator including a magnetic circuit or a piezoelectric element.

(13) The distance measuring module according to any one of (3) to (7), in which the collimator optical system is a collimator lens, and the light source further includes a reflecting mirror that reflects the substantially parallel light from the collimator lens and guides the substantially parallel light to the diffractive optical element.

(14) The distance measuring module according to any one of (3) to (7), in which the collimator optical system is a collimator lens, and the diffractive optical element is formed on a surface of a reflecting mirror that reflects the substantially parallel light from the collimator lens.

(15) The distance measuring module according to any one of (3) to (7), in which the diffractive optical element is formed on a surface of the collimator optical system.

(16) The distance measuring module according to any one of (3) to (15), in which the collimator optical system is a Fresnel lens.

(17) The distance measuring module according to any one of (1) to (16), in which the diffractive optical element is installed so that an optical axis is inclined with respect to an imaging surface of the imaging element.

(18) The distance measuring module according to (17), in which the imaging element sets, as an imaging range, an area other than an irradiation area of 0th order light from the diffractive optical element, on the basis of inclination of the optical axis.

(19) The distance measuring module according to (17) or (13), in which the diffractive optical element corrects deformation or distortion of an irradiation pattern shape caused by inclination of the optical axis.

(20) The distance measuring module according to any one of (1) to (19), in which the imaging element is a two-dimensional area sensor.

(21) The distance measuring module according to any one of (3) to (20), in which the collimator optical system is an aspherical mirror.

(22) The distance measuring module according to any one of (1) to (21), in which each of the line light beams has a curve.

(23) The distance measuring module according to any one of (1) to (22), in which the line light beams are infrared light, and the infrared light reflected by the subject is detectable by the imaging element.

REFERENCE SIGNS LIST

100 Light emitting unit
110 Actuator driver
120 Actuator driving unit
130 Laser driver
140 Light source laser driving unit
150 Semiconductor laser
160 Reflecting prism
161 Reflecting mirror
170 Actuator
180 Collimator lens
190 Diffractive optical element
200 Light receiving unit
210 Lens unit
211 Lens
220 Imaging element
230 Imaging signal processing circuit
290 Distance measuring unit
510 Object
520 Line light beams
521 0th order light
530 Target
541, 542 Reflected light
550 Base line

What is claimed is:

1. A device, comprising:
    a diffractive optical element that emits a predetermined number of line light beams;
    an imaging element that images the line light beams with which a subject is irradiated;
    a distance measuring device that measures a distance from the subject by using triangulation on a basis of the imaged line light beams; and
    a light source that supplies substantially parallel light to the diffractive optical element, wherein the light source further includes an actuator that vibrates the substantially parallel light, and wherein the actuator vibrates the substantially parallel light so that its amplitude is larger than a width of an interval between the line light beams.

2. The device according to claim 1, wherein the light source includes a laser that generates a laser beam, and a collimator optical system that converts the laser beam from the laser into the substantially parallel light.

3. The device according to claim 2, wherein the collimator optical system is a collimator lens, and the light source further includes a reflecting mirror that reflects the substantially parallel light from the collimator lens and guides the substantially parallel light to the diffractive optical element.

4. The device according to claim 2, wherein the collimator optical system is a collimator lens, and the diffractive optical element is formed on a surface of a reflecting mirror that reflects the substantially parallel light from the collimator lens.

5. The device according to claim 2, wherein the diffractive optical element is formed on a surface of the collimator optical system.

6. The device according to claim 2, wherein the collimator optical system is a Fresnel lens.

7. The device according to claim 2, wherein the collimator optical system is an aspherical mirror.

8. The device according to claim 1, wherein the imaging element images the line light beams in conjunction with the vibration.

9. The device according to claim 1, wherein the diffractive optical element is installed so that an optical axis is inclined with respect to an imaging surface of the imaging element.

10. The device according to claim 9, wherein the imaging element sets, as an imaging range, an area other than an irradiation area of 0th order light from the diffractive optical element on a basis of inclination of the optical axis.

11. The device according to claim 9, wherein the diffractive optical element corrects deformation or distortion of an irradiation pattern shape caused by inclination of the optical axis.

12. The device according to claim 1, wherein the imaging element is a two-dimensional area sensor.

13. The device according to claim 1, wherein each of the line light beams has a curve.

14. The device according to claim 1, wherein the line light beams are infrared light, and the infrared light reflected by the subject is detectable by the imaging element.

15. The device according to claim 1, wherein the actuator vibrates the substantially parallel light in a direction orthogonal to a direction of the line light beams.

16. The device according to claim 1, further comprising a sensor that detects a position of an object to be vibrated by the actuator, wherein the imaging element performs imaging in conjunction with the vibration, in accordance with the detected position.

17. The device according to claim 2, wherein the actuator vibrates the substantially parallel light by vibrating the collimator optical system.

18. The device according to claim 2, wherein the actuator vibrates the substantially parallel light by vibrating the laser beam from the laser.

19. The device according to claim 2, wherein the collimator optical system is a collimator lens, and the light source further includes a reflecting mirror that reflects the laser beam from the laser and guides the laser beam to the collimator lens.

20. The device according to claim 19, wherein the actuator vibrates the substantially parallel light by changing an angle of the reflecting mirror.

21. The device according to claim 1, wherein the actuator includes a magnetic circuit or a piezoelectric element.

* * * * *